US010391572B2

(12) United States Patent
Ammon et al.

(10) Patent No.: US 10,391,572 B2
(45) Date of Patent: Aug. 27, 2019

(54) DEVICE, METHOD, AND SYSTEM FOR COOLING A FLAT OBJECT IN A NONHOMOGENEOUS MANNER

(71) Applicant: SEMIKRON ELEKTRONIK GMBH & CO. KG, Nuremberg (DE)

(72) Inventors: Jörg Ammon, Erlangen (DE); Harald Kobolla, Seukendorf (DE)

(73) Assignee: SEMIKRON ELEKTRONIK GbmH & CO. KG, Nuremberg (DE)

( * ) Notice: Subject to any disclaimer, the term of this patent is extended or adjusted under 35 U.S.C. 154(b) by 0 days.

(21) Appl. No.: 15/556,241

(22) PCT Filed: Mar. 15, 2016

(86) PCT No.: PCT/DE2016/100116
§ 371 (c)(1),
(2) Date: Sep. 6, 2017

(87) PCT Pub. No.: WO2016/169551
PCT Pub. Date: Oct. 27, 2016

(65) Prior Publication Data
US 2018/0050406 A1    Feb. 22, 2018

(30) Foreign Application Priority Data

Apr. 24, 2015   (DE) .................. 10 2015 106 298

(51) Int. Cl.
*B23K 31/02*       (2006.01)
*B23K 3/08*        (2006.01)
(Continued)

(52) U.S. Cl.
CPC ............ *B23K 3/085* (2013.01); *B23K 1/0016* (2013.01); *B23K 37/003* (2013.01); *C21D 11/00* (2013.01);
(Continued)

(58) Field of Classification Search
CPC .... B23K 3/085; B23K 1/0016; B23K 37/003; C21D 11/00; C21D 11/005; C21D 2221/00; C21D 1/38
(Continued)

(56) References Cited

U.S. PATENT DOCUMENTS 2,332,368 A * 10/1943 Burtenshaw ........... B21D 53/08
219/85.16
3,710,069 A * 1/1973 Papadopoulos ........ B23K 1/005
118/641
(Continued)

FOREIGN PATENT DOCUMENTS

DE      19539392     4/1997
EP      0 802 010    10/1997
(Continued)

OTHER PUBLICATIONS

PCT/DE2016/100116, International Search Report and Written Opinion dated Jul. 22, 2016, 6 pages—English (now translated), 10 pages—German.
(Continued)

*Primary Examiner* — Kiley S Stoner
(74) *Attorney, Agent, or Firm* — Lackenbach Siegel, LLP; Andrew F. Young (57) ABSTRACT

The apparatus serves for inhomogeneous cooling of a flat object with a first main face and a second main face opposite the first main face. The flat object is cooled by a cooling device from the direction of the first main face. On the second main face, a heating device locally acts upon a first partial face in such a way that the flat object is subjected to heat at said first partial face relative to a second partial face adjoining said first partial face in such a way that said first partial face is cooled more slowly in comparison with the second partial face and, during the cooling process, the second main face of the flat object therefore has an inho-
(Continued)

mogeneous temperature distribution at least in a partial time period of the cooling.

13 Claims, 4 Drawing Sheets

(51) Int. Cl.
  *B23K 1/00* (2006.01)
  *B23K 37/00* (2006.01)
  *C21D 11/00* (2006.01)
  *C21D 1/38* (2006.01)
(52) U.S. Cl.
  CPC .............. *C21D 11/005* (2013.01); *C21D 1/38* (2013.01); *C21D 2221/00* (2013.01)
(58) Field of Classification Search
  USPC ................ 228/233.2, 46, 200, 179.1–180.22
  See application file for complete search history.

(56) References Cited

U.S. PATENT DOCUMENTS

| | | | | |
|---|---|---|---|---|
| 3,764,772 A * | 10/1973 | Matuschek | ........... | B23K 1/0053 219/85.12 |
| 5,685,475 A * | 11/1997 | Jairazbhoy | ............. | B23K 1/085 228/37 |
| 5,785,233 A * | 7/1998 | Nutter | .................... | B23K 1/008 228/46 |
| 5,842,627 A * | 12/1998 | Takanashi | ............... | B23K 3/085 228/180.1 |
| 6,138,893 A * | 10/2000 | Caletka | .................... | B23K 3/08 228/102 |
| 6,145,734 A * | 11/2000 | Taniguchi | ............... | B23K 1/008 228/180.22 |
| 6,164,516 A * | 12/2000 | Watanabe | .............. | B23K 1/085 228/37 |
| 6,311,391 B1 * | 11/2001 | Fuke | ................. | H01L 21/67144 228/105 |
| 6,347,734 B1 * | 2/2002 | Downes | ............... | B23K 1/0016 228/180.21 |
| 7,389,903 B2 * | 6/2008 | Bergmann | ........... | B23K 1/0056 228/33 |
| 8,210,417 B2 * | 7/2012 | Akiyama | .......... | H01L 21/67092 228/44.7 |
| 8,286,853 B2 * | 10/2012 | Akiyama | .......... | H01L 21/67092 228/180.21 |
| 8,333,009 B2 * | 12/2012 | Hirata | ................. | B32B 38/1833 228/180.21 |
| 8,444,043 B1 * | 5/2013 | Bernier | ............. | H01L 23/49816 228/180.22 |
| 8,490,856 B2 * | 7/2013 | Hirakawa | .............. | B32B 37/06 228/180.21 |
| 9,485,872 B2 * | 11/2016 | Hiyama | .................. | B23K 1/008 |
| 2003/0019917 A1 * | 1/2003 | Furuno | ................... | B23K 1/206 228/246 |
| 2003/0034381 A1 * | 2/2003 | Nakatsuka | ............ | B23K 1/085 228/180.1 |
| 2003/0099049 A1 * | 5/2003 | Hayata | ................. | B23K 20/004 359/885 |
| 2004/0134975 A1 * | 7/2004 | Goenka | ................ | B23K 1/0016 228/248.1 |
| 2004/0200878 A1 * | 10/2004 | Goenka | ................ | B23K 1/0016 228/46 |
| 2007/0254255 A1 * | 11/2007 | Neville | .................. | B23K 3/085 432/121 |
| 2009/0045245 A1 * | 2/2009 | Yamamoto | ............. | B23K 1/018 228/119 |
| 2009/0134204 A1 * | 5/2009 | Kimbara | .............. | B23K 1/0016 228/179.1 |
| 2009/0266811 A1 * | 10/2009 | Kimbara | .............. | B23K 1/0016 219/616 |
| 2010/0080542 A1 * | 4/2010 | Tartock | ................ | H05B 3/0033 392/432 |
| 2013/0291378 A1 * | 11/2013 | Higashizawa | ......... | H05K 13/04 29/739 |
| 2013/0308276 A1 * | 11/2013 | Suzuki | .................... | H01L 23/36 361/717 |
| 2014/0045130 A1 * | 2/2014 | Eckertsberger | .......... | C21D 1/34 432/18 |
| 2015/0090768 A1 * | 4/2015 | Kuroda | .................. | B23K 1/005 228/46 |
| 2015/0257280 A1 * | 9/2015 | Ciliox | .................. | H05K 3/3484 228/122.1 |
| 2015/0321278 A1 * | 11/2015 | Matsuda | ................ | B23K 1/008 219/85.13 |
| 2015/0366079 A1 * | 12/2015 | Matsuda | ................ | B23K 1/008 219/72 |
| 2015/0380381 A1 * | 12/2015 | Seyama | ................. | H01L 24/81 228/46 |
| 2016/0105005 A1 * | 4/2016 | Fujita | ....................... | H01R 4/68 228/212 |
| 2016/0196560 A1 * | 7/2016 | Nolan | ................ | H05B 37/0236 700/94 |
| 2016/0229001 A1 * | 8/2016 | Rinker | ............... | B23K 37/0435 |
| 2016/0254245 A1 * | 9/2016 | Wasserman | ............. | H01L 24/75 228/180.1 |
| 2017/0066030 A1 * | 3/2017 | Frost | ..................... | B21D 37/16 |
| 2017/0136570 A1 * | 5/2017 | Seok | .................. | B23K 20/026 |
| 2017/0203377 A1 * | 7/2017 | Yokoyama | ............ | B23K 1/002 |
| 2017/0243851 A1 * | 8/2017 | Rangelov | .............. | B23K 1/0016 |
| 2017/0274465 A1 * | 9/2017 | Gould | .................. | B23K 1/0014 |

FOREIGN PATENT DOCUMENTS

| | | | | |
|---|---|---|---|---|
| EP | 1954110 | | 11/2006 | |
| JP | 2001015545 A | * | 1/2001 | .......... B23K 20/004 |
| JP | 2004320023 A | * | 11/2004 | .......... B23K 1/0016 |
| JP | 2015 009262 | | 1/2015 | |
| WO | WO 2013/000001 | | 1/2013 | |
| WO | WO-2014103946 A1 | * | 7/2014 | ............. B23K 1/008 |

OTHER PUBLICATIONS

PCT/DE2016/100116, International Search Report and Written Opinion dated Jul. 22, 2016, 2 pages—English, 10 pages—German.
German Appln. No. 10 2015 106 298.4, Office Action dated Oct. 12, 2015, 2 pages—German, 2 pages—English.

* cited by examiner

DEVICE, METHOD, AND SYSTEM FOR COOLING A FLAT OBJECT IN A NONHOMOGENEOUS MANNER

CROSS REFERENCE TO RELATED APPLICATIONS

This application relates to, and claims § 371 priority from PCT/DE2016/100116 filed Mar. 15, 2016 the entire contents of which are incorporated herein by reference, which in turn claims priority from Ser. No. DE 10 2015 106 298.4 filed Apr. 24, 2015.

FIGURE SELECTED FOR PUBLICATION

FIG. 4

BACKGROUND OF THE INVENTION

Field of the Invention

The invention describes an apparatus and an associated method for inhomogeneous cooling of a flat object, in particular from the field of electrotechnology. The application of the apparatus in an installation, more precisely a soldering installation for electrotechnical components, is furthermore described.

Description of the Related Art

In particular, it is routine in the art to connect components in electrotechnology to one another or to a component carrier by means of a solder connection. In order to produce a solder connection of this kind, liquefied solder that is arranged between the two elements to be connected and that is in contact with the elements to be connected is cooled to below the melting point. The solder that is solidified by the cooling process forms a materially-bonded solder connection between the two elements.

Particularly in the case of flat solder connections, it is desirable here for the solder connection to form a homogeneous layer, that is to say a layer without gas inclusions, which are known as shrink holes.

DE 10 2011 081 606 A1 discloses a cooling apparatus for cooling the still-liquid solder, in which a complexly configured and controlled heat sink effects targeted inhomogeneous cooling of the solder. The temperature distribution of the solder during the cooling process should be configured to be inhomogeneous in order to cause the solidification front of the solder to flow proceeding from a starting region to the outside during cooling of said solder. In this case, the creation of shrink holes must be prevented effectively.

A flaw of the mentioned cooling apparatus in accordance with the prior art is the complex regulation of the controlled heat sink.

ASPECTS AND SUMMARY OF THE INVENTION

According to one aspect of the present invention, there is provided an apparatus that serves for inhomogeneous cooling of a flat object with a first main face and a second main face opposite the first main face. The flat object is cooled by a cooling device from the direction of the first main face. On the second main face, a heating device locally acts upon a first partial face in such a way that the flat object is subjected to heat at said first partial face relative to a second partial face adjoining said first partial face in such a way that said first partial face is cooled more slowly in comparison with the second partial face and, during the cooling process, the second main face of the flat object therefore has an inhomogeneous temperature distribution at least in a partial time period of the cooling.

With knowledge of these stated conditions, the invention is based on the object of providing an apparatus and an associated method that effects inhomogeneous cooling of a main face of a flat object in a simple manner and of specifying a soldering installation, in which said apparatus can be arranged.

This object is achieved in accordance with the invention by an apparatus having the features in the claims, and by a method having the features of the claims, and by a soldering installation having the features of the claims.

The apparatus according to the invention serves for inhomogeneous cooling of a flat object with a first main face and a second main face opposite said first main face. Here, the flat object is cooled by a cooling device from the direction of the first main face. On the second main face, a heating device locally acts upon a first partial face in such a way that the flat object is subjected to heat at said first partial face relative to a second partial face adjoining said first partial face in such a way that said first partial face is cooled more slowly in comparison with the second partial face and, during the cooling process, the second main face of the flat object therefore has an inhomogeneous temperature distribution at least in a partial time period of the cooling.

The term "cooling of the second main face" should be understood here to mean, in particular, that the adjoining volume of the flat object, that is to say its local volume region that extends from the second main face into the interior of the object, is likewise also cooled. The same applies to the first and second partial face. Furthermore, in each case, the term "face" should not be explicitly understood here in the mathematical sense, but as a surface that can thus exhibit a certain topology, that is to say differences in height over its profile. It is of course possible for the features specified in the singular, in particular the first and second partial face, to be present in plural as well, provided that this is not ruled out per se.

The flat object is preferably a base plate of a power semiconductor module with power electronic substrates arranged thereon, wherein solder is arranged between the base plate and the respective substrate. Alternatively, the flat object can be a power electronic substrate with power semiconductor components arranged thereon, wherein solder is arranged between the substrate and the respective power semiconductor component.

The cooling device is preferably configured as a water cooling device or as an air cooling device. During cooling, it is possible, in principle, for any cooling device to be in thermal contact with the first main face of the flat object or to be arranged spaced apart from the first main face of the flat object. It is likewise possible for any cooling device to be configured to cool the first main face homogeneously, wherein this is understood to mean uniform cooling of the first main face within the scope of technical implementability.

The heating device is particularly preferably arranged spaced apart from the second main face. In this case, the heating device is preferably configured as an IR-LED (infrared light-emitting diode) or as a technical realization of a black-body radiator, which in turn is preferably embodied as a halogen lamp, wherein the respectively preferred peak wavelength is between 0.7 micrometers and 10 micrometers, preferably 0.7 to 3 micrometers.

An additional beamformer will often be associated with the heating device configured as an IR-LED or a black-body radiator. Said beamformer can be configured, in particular, as a diaphragm, a diaphragm matrix, a filter, a filter matrix, a hologram, a hologram matrix, an axicon, an axicon matrix, a mirror, a mirror matrix, a lens or a lens matrix, or as a combination thereof.

The method according to the invention for using an abovementioned apparatus for inhomogeneous cooling of a flat object with a first main face and a second main face opposite said first main face has the following steps:

a. The flat object is cooled by a cooling device from the direction of the first main face for a first time period.

b. For a second time period, a heating device locally acts upon a partial face of the second main face in such a way that the flat object is subjected to heat at said partial face relative to the second partial face and as a result the flat object is cooled more slowly at said first partial face in comparison with the second partial face for a third time period and therefore has an inhomogeneous temperature distribution in said third time period.

In this case, it is preferable for the second time period to be entirely or partially before, during or after the first time period. The term time period should not exclusively be understood here as meaning a continuous time period, but instead a time period can also include a plurality of partial time periods, that is to say, in other words, a time period can also be interrupted.

It is essential for the method that the respective time periods are selected in such a way that the solidification of the solder in the region of the first partial face by the local, relative heating is delayed until the solidification in the region of the second partial face has started. The time profile of a solidification front can therefore be controlled in such a way that the formation of shrink holes is substantially reduced and hence the resulting solder layer is of a high quality.

A soldering installation according to the invention having an abovementioned apparatus is configured as a continuous soldering installation having a multiplicity of chambers. Soldering installations of this kind are known with different soldering methods, for example as vapor phase soldering installations. Said soldering installations usually have three process chambers: a pre-chamber for pre-heating under the soldering temperature, a main chamber, in which the solder is liquefied, and a cooling chamber. The apparatus according to the invention is arranged in said cooling chamber.

It goes without saying that the various configurations of the invention may be implemented individually or in any combinations in order to achieve improvements. In particular, the abovementioned features and those which are explained here or below can be used not only in the specified combinations but also in other combinations that are not mutually exclusive or on their own without departing from the scope of the present invention.

Further explanations of the invention, advantageous details and features emerge from the following description of the exemplary embodiments of the invention that are schematically illustrated in FIGS. 1 to 6 or from respective parts thereof.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

Figure 1:
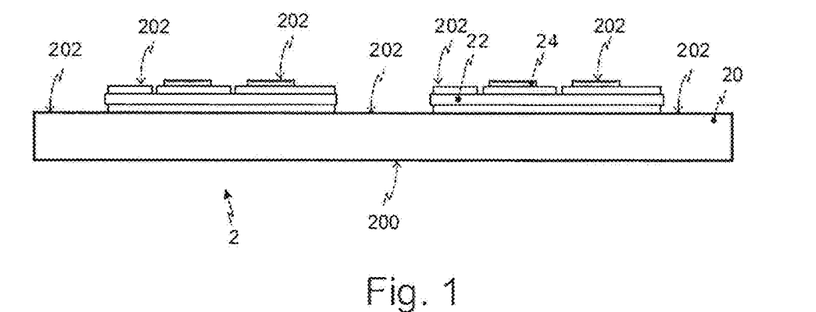
FIG. 1 shows a side view of a first configuration of a flat object.

FIG. 1 shows a side view of a first configuration of a flat object 2. In this configuration, the flat object 2 has a base plate 20. Without any restriction of generality, said base plate is a base plate of a power semiconductor module and consists of copper or an alloy having copper as the main component. Furthermore, said base plate 20 has a solderable surface coating, for example comprising a thin layer of nickel.

Two power electronic substrates 22 are arranged on one surface of the base plate 20 and are connected in a materially-bonded manner to the base plate 20 by means of a solder layer (not illustrated). Said power electronic substrates 22 are moreover configured in a manner that is routine in the art and each have a layer sequence beginning with a solderable layer that is connected to the base plate. Following this layer is a layer of industrial ceramic, which is in turn followed by a conductive layer, which is inherently structured and therefore forms conductor tracks. Power semiconductor components 24 are arranged on said conductor tracks and are connected thereto in a materially-bonded manner in a way that is routine in the art.

Said components 20, 22, 24, 26 form here the first flat object 2, the first main face 200 of which is formed by the surface of the base plate 20 that faces away from the power electronic substrates 22. The second main face 202 of the flat object 2, said second main face lying opposite the first main face, is formed by the exposed surfaces of the base plate 20, the power electronic substrates 22 and the power semiconductor components 24. Said second surface therefore has a certain topography, that is to say a surface contour, which is not represented to scale in this illustration. Said first flat object 2 forms a component of a power semiconductor module that is routine in the art.

Figure 2:
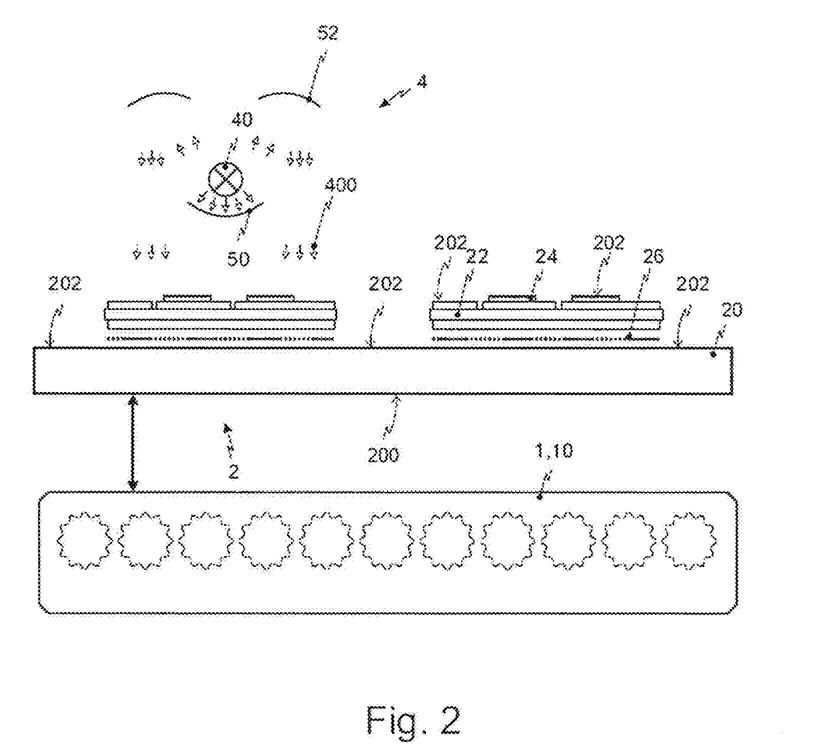
FIG. 2 shows the first flat object and a first configuration of the apparatus according to the invention.

FIG. 2 shows the first flat object 2 and a first configuration of the apparatus according to the invention, which in this case serves to form the materially-bonded, in this case soldered, connection of the base plate 20 to the two power electronic substrates 22, wherein in this case the power semiconductor components 24 are already connected to the substrates 22 in a materially-bonded manner. The base plate 20, the solder layer 26 and the substrates 22 are illustrated spaced apart purely and solely for clarity.

The first apparatus according to the invention has a cooling device 1, which is configured here as a water cooling device 10, with schematically illustrated cooling ducts. The cooling effect of said cooling device 1 can be regulated in its entirety by means of the amount of water flowing through and the temperature thereof. A homogeneous temperature distribution, within the scope of accuracy that is routine in the art, is therefore created on the top side that faces the base plate 20, that is to say the first main face 200 of the flat object 2.

The cooling device 10 can be arranged spaced apart from but also in direct thermal contact with the first main face 200 of the flat object 2. Within the scope of the method, it may also be advantageous to bring the cooling device 10 into contact with the base plate 20 for fast, initial cooling and to use it spaced apart from said base plate in a later step, in order to reduce the cooling output. The specific configuration of this method step fundamentally depends on the necessary cooling outputs. However, it is essential here that the temperature of the active surface of the cooling device 10 is not regulated locally.

The first apparatus according to the invention furthermore has a heating device 4, which in this case consists of a combination of an infrared radiating element 40, for example a halogen lamp with a peak wavelength of 1.2 micrometers having an arrangement of a convex mirror 50 and a mirror matrix 52, as well as having diaphragms (not illustrated). The light 400 emerging from the halogen lamp 40 is guided via the mirrors and diaphragms in such a way that it impinges on the edge region of the power electronic substrates 22. For the effect of this, reference is made here in particular to the description of FIG. 4.

Figure 3:
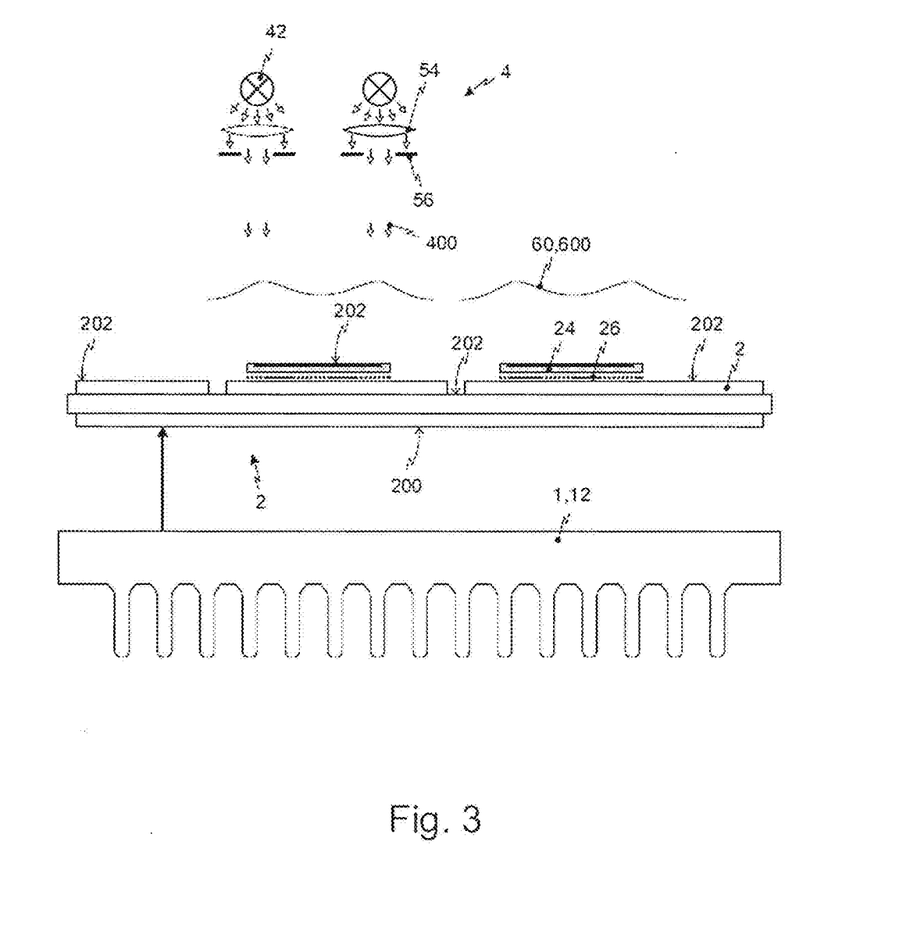
FIG. 3 shows a second configuration of the apparatus according to the invention with a second configuration of the flat object.

FIG. 3 shows a second configuration of the apparatus according to the invention with a second flat object 2. In this second configuration of the flat object 2, said object has a power electronic substrate 22. Said power electronic substrate 22 is moreover configured in a manner that is routine in the art and has a layer sequence from a lower metallic layer, which is only optional, however. Following this layer is a layer of industrial ceramic, or another electrically insulating layer, which is in turn followed by a conductive layer, which is inherently structured and therefore forms conductor tracks. Power semiconductor components 24 are arranged on said conductor tracks and are connected thereto using solder. The power electronic substrate 22, the solder layer 26 and the power semiconductor components 24 are illustrated spaced apart purely for clarity.

Said components 22, 24, 26 form here the second flat object 2, the first main face 200 of which is formed by the bottom side of the power electronic substrate 22. The second main face 202 of the flat object 2, said second main face lying opposite the first main face, is formed by the exposed surfaces of the power electronic substrate 22 and the power semiconductor components 24. Said second surface 202 therefore has a certain topography, that is to say a surface contour, which is not represented to scale in this illustration. Said second flat object 2 likewise forms a component of a power semiconductor module that is routine in the art.

The second apparatus according to the invention likewise has a cooling device 1, which is configured here as an air cooling device 12, with schematically illustrated cooling fins. The cooling effect of said cooling device 12 is very homogeneous overall and is usually lower than that of a water cooling device. This may be advantageous for a particularly gentle cooling of the flat object 2. The cooling device 12 is preferably arranged in direct thermal contact with the first main face 200 of the flat object 2.

The second apparatus according to the invention furthermore has a heating device 4, which in this case consists of a combination of a plurality of IR-LEDs 42, with a peak wavelength of 0.9 micrometers having respectively associated lenses 54, for example a microlens grid, as well as associated diaphragms 56. The light 400 emerging from the IR-LEDs 42 is guided via the respectively associated lenses and diaphragms in such a way that it impinges on the edge region of the power semiconductor components 24. For the fundamental effect of a heating device of this kind, reference is additionally made here to the description regarding FIGS. 5 and 6.

The effect of the heating device 4 is schematically illustrated by a temperature profile 600, as appears over the course of the method on the second main face 202. During the cooling phase in which the solder solidifies, a higher temperature prevails in each case at the edges of the power semiconductor components 24 than in the center of the respective power semiconductor component 24.

Figure 4:
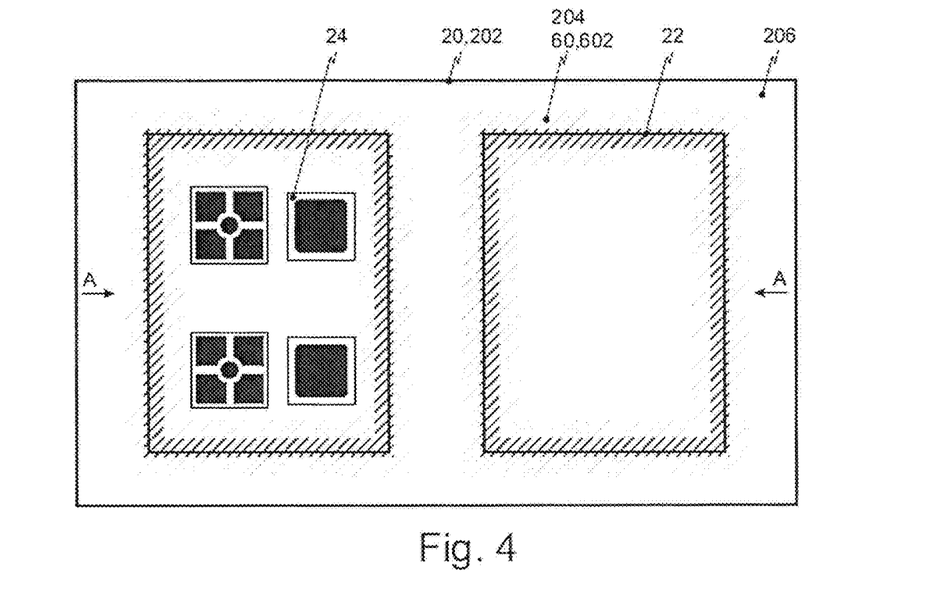
FIG. 4 shows a plan view of the first flat object.

FIG. 4 shows a plan view of the first flat object 2. A base plate 20 having two power electronic substrates 22 is illustrated here, wherein only one of the two power semiconductor components 24 is illustrated.

The effect of the heating device is further illustrated. The hatched faces correspond here to the first partial faces 204 of the second main face 202, which have a higher temperature compared to second partial faces 206 surrounding them and, as here, compared to second partial faces 206 enclosed by them.

The point of the heating device is that it is able to heat the first partial face 204 locally compared to the whole face, and specifically compared to a second partial face 206. The heating in this case and also in general within the scope of the invention is, in particular, not absolute heating compared to a starting temperature of the second main face, even if this is possible for a short time at the beginning of the method, but is instead relative heating of the first partial face 204 relative to the second partial face 206. In other words, this means that the effect of the cooling device substantially exceeds that of the heating device when viewed in absolute terms. This is explicitly necessary to effect cooling of the entire flat object and in particular the solder layer, for the transition from the liquid to the solid state. The heating device therefore counteracts the cooling device in such a way that the first partial face cools more slowly than the adjacent second partial face. The solder therefore solidifies starting in the second partial face and the solidification front moves in the direction of the strongest heating by the heating device, as a result of which, for example, gas inclusions, what are known as shrink holes, in the solder layer are significantly reduced.

Figure 5:
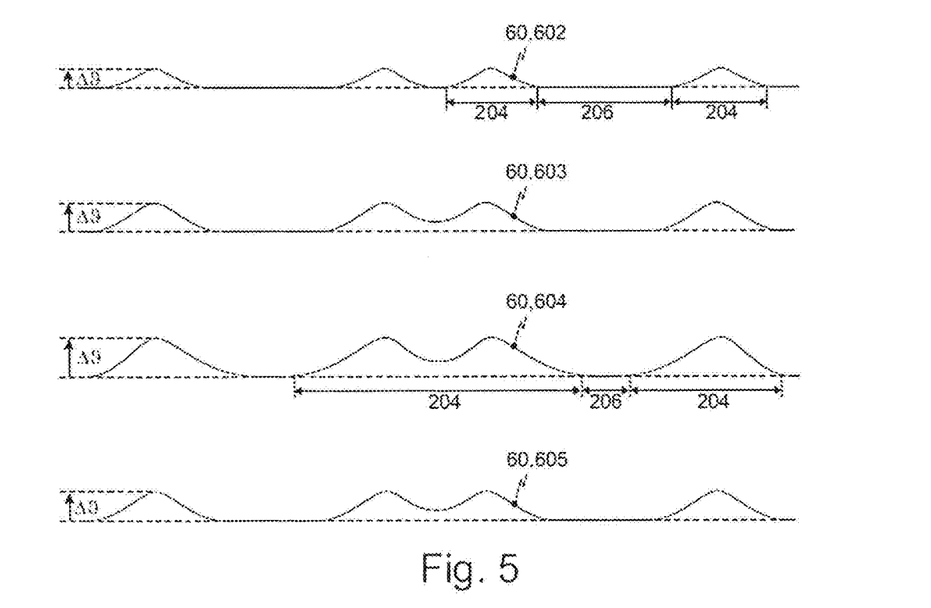
FIG. 5 shows a time profile of the surface temperature of the second main face of the first flat object during the method according to the invention.

FIG. 5 shows a time profile of the surface temperature 60, 602, 603, 604, 605 of the second main face 202 along the section A-A of the first flat object from FIG. 4, during the temporal course of the method according to the invention. Relative temperatures are illustrated in each case.

At a first instant (first curve) after the start of the method, the regions at the edge of the power electronic substrates are slightly warmer than the central regions thereof, said central regions having the same temperature as the base plate.

At a later instant (second curve), said temperature difference is intensified; a slightly increased temperature of the base plate between the power electronic substrates also becomes apparent.

At a later instant (third curve), this effect has intensified further, however the temperature of the base plate remains below that of the edge regions of the power electronic substrates. It is clear here that the first partial faces expand and hence the second partial faces shrink over the course of the process. The solder ideally starts to solidify at this instant, since in this case the solidification region is very limited to the center of the respective power electronic substrates. With ongoing cooling, the solidification front now moves from the center to the edge region of the power electronic substrates.

Up until close to the termination of the cooling, in which the solder is almost completely solidified at a later instant (fourth curve), the relatively higher temperature is in the edge region of the power electronic substrates.

A typical temperature at the beginning of the method is 250° C. The solder is completely liquid at this temperature. The entire flat object is also in thermal equilibrium. The cooling begins with the cooling of the first main face by means of the cooling device. Since the cooling on the second main face begins with a time delay, the heating device can take place either shortly before, at the same time as or else shortly after the beginning of the cooling of the first main face. In this case, it is advantageous for the starting temperature not to be exceeded locally at the first partial faces.

The part of the cooling process considered to be essential here ends, in which solder having a solidification temperature of 220° C. (assumed here by way of example) at a homogenous temperature of the flat object of 200° C. In this cooling phase of 250° C. to 200° C., the temperature difference $\Delta\theta$ is between 2° C. and 5° C., wherein said value is held, in particular, in the temperature range of the cooling phase of 230° C. to 210° C.

Figure 6:
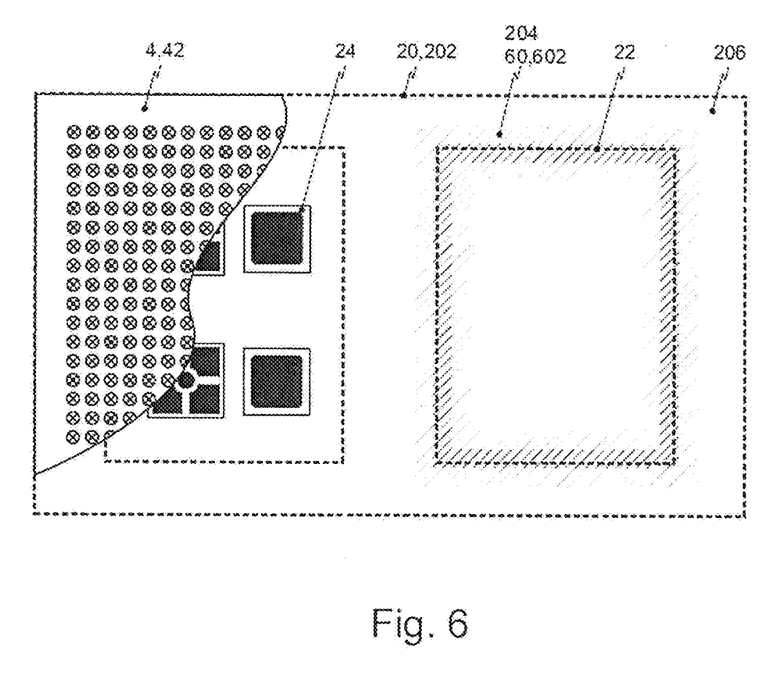
FIG. 6 shows a third configuration of the apparatus according to the invention with the first flat object.

FIG. 6 shows a third configuration of the apparatus according to the invention with the first flat object 2. In this case, it is essential that the heating device 4 is configured in a simple and therefore very variable manner. Said heating device consists of a matrix of IR-LEDs 42, which can be driven individually, can also ideally be regulated individually in terms of their power and which are arranged above the relevant region of the second main face. Beamformers that are mentioned above and routine in the art can be used for the respective IR-LEDs 42 for the purpose of further improvement, in particular homogenization of the power.

Using this third apparatus according to the invention, not only the depicted local heating but also an approximately arbitrary distribution and control of the local heating is possible.

It is therefore possible to determine specifically that region, the first partial face, at which the solder starts to solidify. It is likewise possible to individually control the course of the solidification front as well as the spreading rate thereof. An extremely individual temporal and spatial progression of the solidification of the solder is therefore possible by simply regulating the power of the IR-LEDs.

Also, the inventors intend that only those claims which use the words "means for" are intended to be interpreted under 35 USC 112, sixth paragraph. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

The invention claimed is:

1. A method for for inhomogeneous cooling of a flat object (2) with a first main face (200) and a second main face (202) opposite said first main face, comprising the steps of:
   a. providing an apparatus configured to inhomogeneously cool said flat object (2) with said first main face (200) and said second main face (202) opposite said first main face, the apparatus further comprising:
      a cooling device (1) that is configured to cool the first main face (200); and
      a heating device (4) configured to act locally upon a first partial face (204) on the second main face (202), the heating device (4) remaining in an active state while the cooling device (1) cools the first main face (200), in such a way that the flat object (2) is subjected to heat at said first partial face (204) relative to a second partial face (206) adjoining said first partial face (204) in such a way that said first partial face (204) is cooled more slowly in comparison with the second partial face (206) and during cooling, the second main face (202) of the flat object (2) therefore has an inhomogeneous temperature distribution at least in a partial time period of the cooling;
   b. cooling for a first time period the flat object (2) by the cooling device (1) from the direction of the first main face (200);
   c. heating for a second time period, wherein the heating device (4) acts locally upon a first partial face (204) of the second main face (202) in such a way that the flat object (2) is subjected to heat at said first partial face (204) relative to the second partial face (206), the heating device (4) remaining in an active state while the step of cooling is performed;
   d. thereby as a result the flat object (2) is cooled more slowly at said first partial face (204) in comparison with the second partial face (206) for a third time period and therefore has an inhomogeneous temperature distribution in said third time period; and
   e. wherein solidification of the solder (26) on the first partial face is delayed until solidification of the solder (26) on the second partial face (206) has started.

2. The method as claimed in claim 1, wherein:
   the second time period occurs at least one of entirely after said first time period, partially before said first time period, and during said first time period.

3. The method as claimed in claim 1, wherein:

the apparatus is configured to inhomogeneously cool the flat object (2) where the flat object (2) is a base plate (20) of a power semiconductor module with a plurality of power electronic substrates (22) arranged thereon and solder (26) is arranged between the base plate (20) and the respective substrate (22).

4. The method as claimed in claim 1, wherein:

the apparatus is configured to inhomogeneously cool the flat object (2) where the flat object (2) is a power electronic substrate (22) with a plurality of power semiconductor components (24) arranged thereon and solder (26) is arranged between the substrate (22) and the respective power semiconductor component (24).

5. The method as claimed in claim 1, wherein:

the cooling device (1) is configured as one of a water cooling device (10) and an air cooling device (12).

6. The method as claimed in claim 1, wherein:

the cooling device (1) is in one of a thermal contact with the first main face (200) of the flat object (2) and is arranged spaced apart from the first main face (200) of the flat object (2).

7. The method as claimed in claim 1, wherein:

the cooling device (1) is configured to cool the first main face (200) homogeneously.

8. The method as claimed in claim 1, wherein:

the heating device (4) is arranged spaced apart from the second main face (202).

9. The method as claimed in claim 1, wherein:

the heating device (4) is configured as a black-body radiator, configured as a halogen lamp (40).

10. The method as claimed in claim 1, wherein:

the heating device (4) is configured as one of an LED and an IR-LED (42).

11. The method as claimed in claim 9, wherein:

a beamformer (50, 52, 54, 56) is associated with the heating device (4).

12. The method as claimed in claim 9, wherein:

a peak wavelength of the heating device (4) is between 0.7 micrometers and 10 micrometers.

13. The method as claimed in claim 11, wherein:

the beamformer is configured as at least one of group consisting of a diaphragm (54), a diaphragm matrix, a filter, a filter matrix, a hologram, a hologram matrix, an axicon, an axicon matrix, a mirror (50), a mirror matrix (52), a lens, a lens matrix, and a combination thereof.

* * * * *